(12) United States Patent
Paso (10) Patent No.: US 10,855,410 B2
(45) Date of Patent: Dec. 1, 2020

(54) ADAPTIVE WAIT IN DATA COMMUNICATIONS

(71) Applicant: Arm Limited, Cambridge (GB)

(72) Inventor: Jarkko Paso, Oulu (FI)

(73) Assignee: ARM Limited, Cambridge (GB)

( * ) Notice: Subject to any disclaimer, the term of this patent is extended or adjusted under 35 U.S.C. 154(b) by 18 days.

(21) Appl. No.: 15/748,229

(22) PCT Filed: Jul. 29, 2016

(86) PCT No.: PCT/GB2016/052338
§ 371 (c)(1),
(2) Date: Jan. 29, 2018

(87) PCT Pub. No.: WO2017/021707
PCT Pub. Date: Feb. 9, 2017

(65) Prior Publication Data
US 2018/0219647 A1 Aug. 2, 2018

(30) Foreign Application Priority Data
Aug. 3, 2015 (GB) ..................................... 1513749

(51) Int. Cl.
*H04L 1/18* (2006.01)
*H04L 12/841* (2013.01)
(Continued)

(52) U.S. Cl.
CPC .............. *H04L 1/188* (2013.01); *H04L 47/27* (2013.01); *H04L 47/28* (2013.01);
(Continued)

(58) Field of Classification Search
CPC ......... H04L 1/188; H04L 1/1867; H04L 1/18; H04L 1/16; H04L 1/12; H04L 47/28;
(Continued)

(56) References Cited

U.S. PATENT DOCUMENTS 6,076,114 A 6/2000 Wesley
6,788,704 B1 * 9/2004 Lindsay ................ H04L 1/1671
370/230
(Continued)

FOREIGN PATENT DOCUMENTS

EP 2 790 436 10/2014
WO WO 2008/110424 9/2008

OTHER PUBLICATIONS

Paxson et al., "RFC 6298: Computing TCP's Retransmission Timer," 2011, EITF.
(Continued)

*Primary Examiner* — Jeffrey M Rutkowski
*Assistant Examiner* — Luna Weissberger
(74) *Attorney, Agent, or Firm* — Leveque IP Law, P.C.

(57) ABSTRACT

A machine-implemented method for controlling retry of unicast data packet transmission from a transmitter node to a receiver node comprises selecting a receiver node from a set of receiver nodes having different processing delays; transmitting a first unicast data packet to the receiver node; establishing a delay, at the transmitter node, for an expected acknowledgement wait duration; receiving, at the transmitter node, an acknowledgement packet from the receiver node; responsive to an actual acknowledgement wait duration being less than the expected duration, setting the expected duration to a new expected duration comprising at least the actual wait duration; transmitting a second unicast data packet to the receiver node; establishing a delay, at the transmitter node, for the new expected duration; and responsive to expiry of the new expected duration without receipt of an acknowledgement packet from the receiver node, retrying transmitting the second unicast data packet.

17 Claims, 12 Drawing Sheets

(51) Int. Cl.
 *H04L 12/807* (2013.01)
 *H04L 1/00* (2006.01)
 *H04W 28/02* (2009.01)
 *H04W 4/70* (2018.01)

(52) U.S. Cl.
 CPC ....... *H04L 2001/0093* (2013.01); *H04W 4/70* (2018.02); *H04W 28/0215* (2013.01)

(58) Field of Classification Search
 CPC . H04L 47/27; H04L 47/10; H04L 2001/0093; H04L 2001/0092; H04W 4/70; H04W 28/0215; H04W 28/02
 USPC .......................................................... 370/329
 See application file for complete search history.

(56) References Cited

U.S. PATENT DOCUMENTS

| | | | |
|---|---|---|---|
| 2003/0143973 A1* | 7/2003 | Nagy | H04B 1/0003 455/403 |
| 2006/0084453 A1* | 4/2006 | Kim | H04L 1/1848 455/517 |
| 2006/0133273 A1* | 6/2006 | Julian | H04W 52/28 370/230 |
| 2007/0025388 A1* | 2/2007 | Abhishek | H04L 1/188 370/447 |
| 2008/0165684 A1 | 7/2008 | Sridharan et al. | |
| 2009/0245105 A1 | 10/2009 | Ho | |
| 2013/0215776 A1* | 8/2013 | Verpooten | H04L 1/18 370/252 |
| 2015/0057819 A1* | 2/2015 | Yoshitani | H04L 1/188 700/286 |

OTHER PUBLICATIONS

GB Intellectual Property Office, GB1513749.0, Combined search and examination report, dated Feb. 5, 2016.
European Patent Office, PCT/GB2016/052338, PCT ISR and Written Opinion, dated Nov. 7, 2016.

* cited by examiner

ADAPTIVE WAIT IN DATA COMMUNICATIONS

FIELD OF THE DISCLOSURE

The present disclosure relates to the controlling of wait durations in networked devices.

BACKGROUND

Since the advent of the Internet, there has been a rapid increase in the interconnectedness of devices capable of storing, processing and communicating data. Now, with the development of what is called the Internet of Things (IoT), devices which were not conventionally equipped to store, process and communicate data are becoming so equipped. One example is that of a domestic refrigerator that is provided with the capability to recognise encoded data associated with a perishable food item, store the data in device storage, and subsequently, on being triggered by a program that monitored the data, warn a user over a network to a smartphone of an impending "use by" date for the food item.

Such extended capabilities for devices bring advantages, but at the same time the devices may suffer from a number of disadvantages. First, the networks they use may be intermittent, for example, ad-hoc networks, and may suffer from bandwidth limitations. Second, the devices themselves may be of limited power and, in some cases, of limited battery life. Third, in large networks of devices, there may be devices of widely differing capabilities, such as differing communication and processing data rates. Fourth, such networks are very large and complex, and consequently impossible for a human administrator to fully comprehend and thereby set operating parameters to strive for optimal performance.

DESCRIPTION OF THE DRAWINGS

Example embodiments of the disclosed technology will be better appreciated by the reader with reference to the appended drawings in which.

DETAILED DESCRIPTION

Examples of devices having differing processing delays are shown in FIGS. 9 to 12. In each of these Figures is shown an example arrangement of various processing devices connected in networks, the devices having varying processors and communication components (in the examples, Radio Frequency components—RF), such that the processing and data communications speeds of the devices vary, affecting the speed at which transmission and receipt of data packets and transmission and receipt of acknowledgement packets occur. The example devices and networks in the figures are, respectively, IoT devices and Internet Protocol v6 Low-power Wireless Personal Area Networks (6LoWPAN), but the problem exists in other arrangements of network and device also, and is in need of alleviation in many network arrangements. The details of the varying processors and communication components in the examples are not significant; the figures are given to exemplify the complexity involved in controlling acknowledgement wait durations in networked devices having widely-varying performance characteristics.

Figure 9:
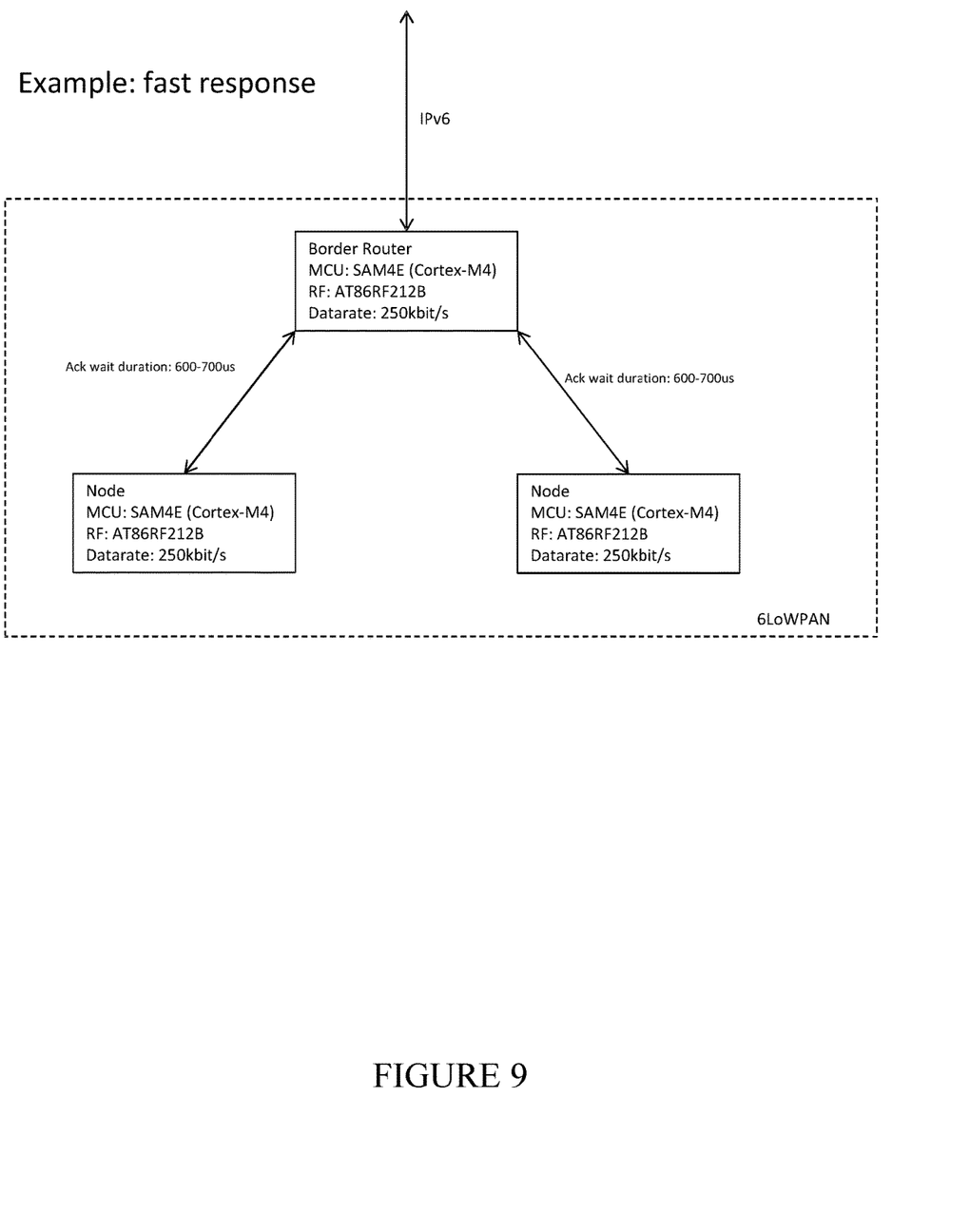
FIGS. 9 to 12 show examples of devices having differing communication and processing data rates.
Figure 10:
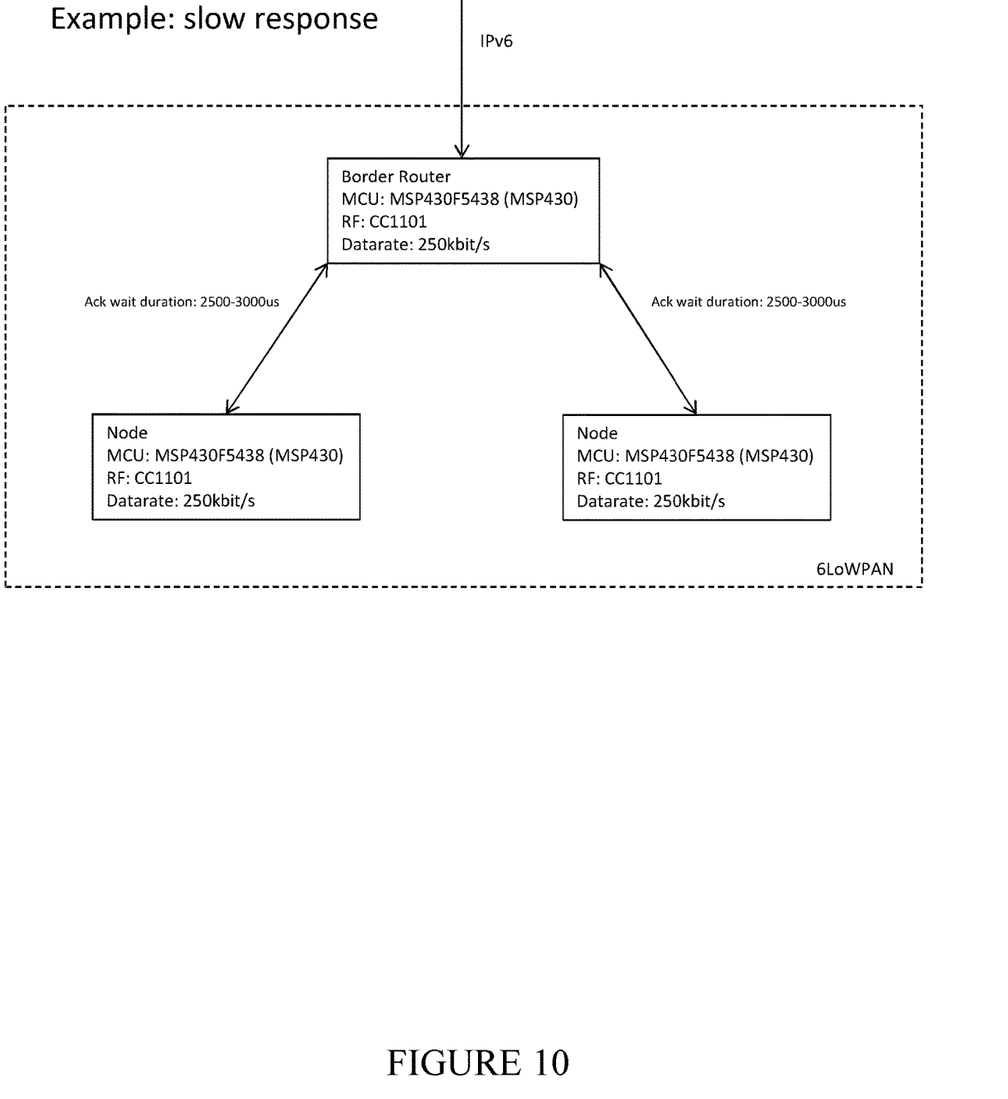

In FIG. 9, there is shown a typical network with fast platforms in terms of processing power (short processing delays). In FIG. 10, there is shown a typical network with slow platforms in terms of processing power (long processing delays). In both platforms, the same data rate (250 kbit/s) is used and therefore these devices are able to communicate with each other as in FIG. 11, where acknowledgement wait duration is short or long depending on the receiver processing delay. In FIG. 12, there is shown the same platform as in FIG. 10, but this time the data rate is decreased to 50 kbit/s which makes the acknowledgement wait duration even longer.

In such conventional arrangements, a system administrator would need to set:

Short fixed Ack wait time for devices in FIG. 9, because only fast devices exist.

Long fixed Ack wait time for devices in FIG. 10, because slow devices exist.

Figure 11:
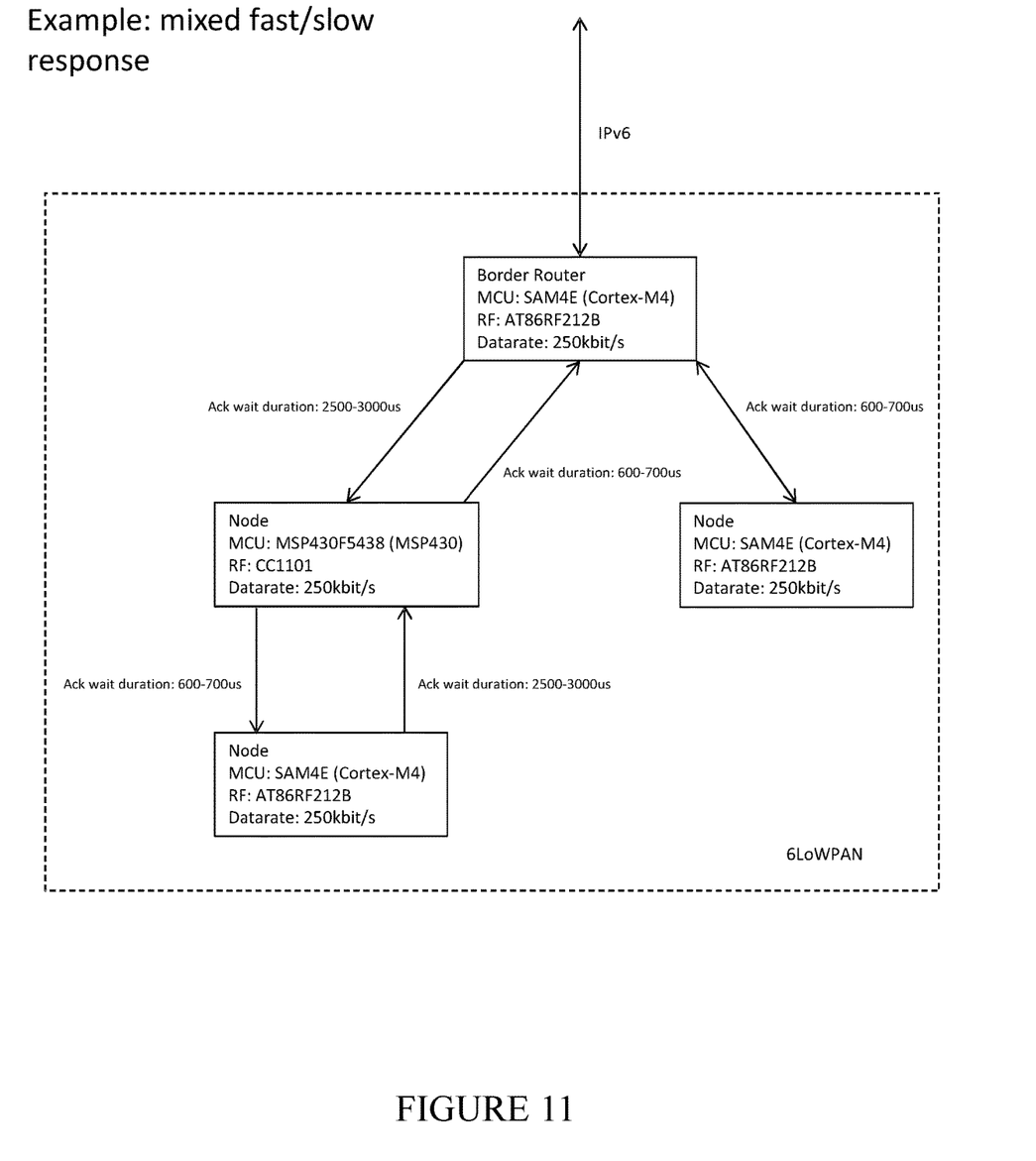
Figure 12:
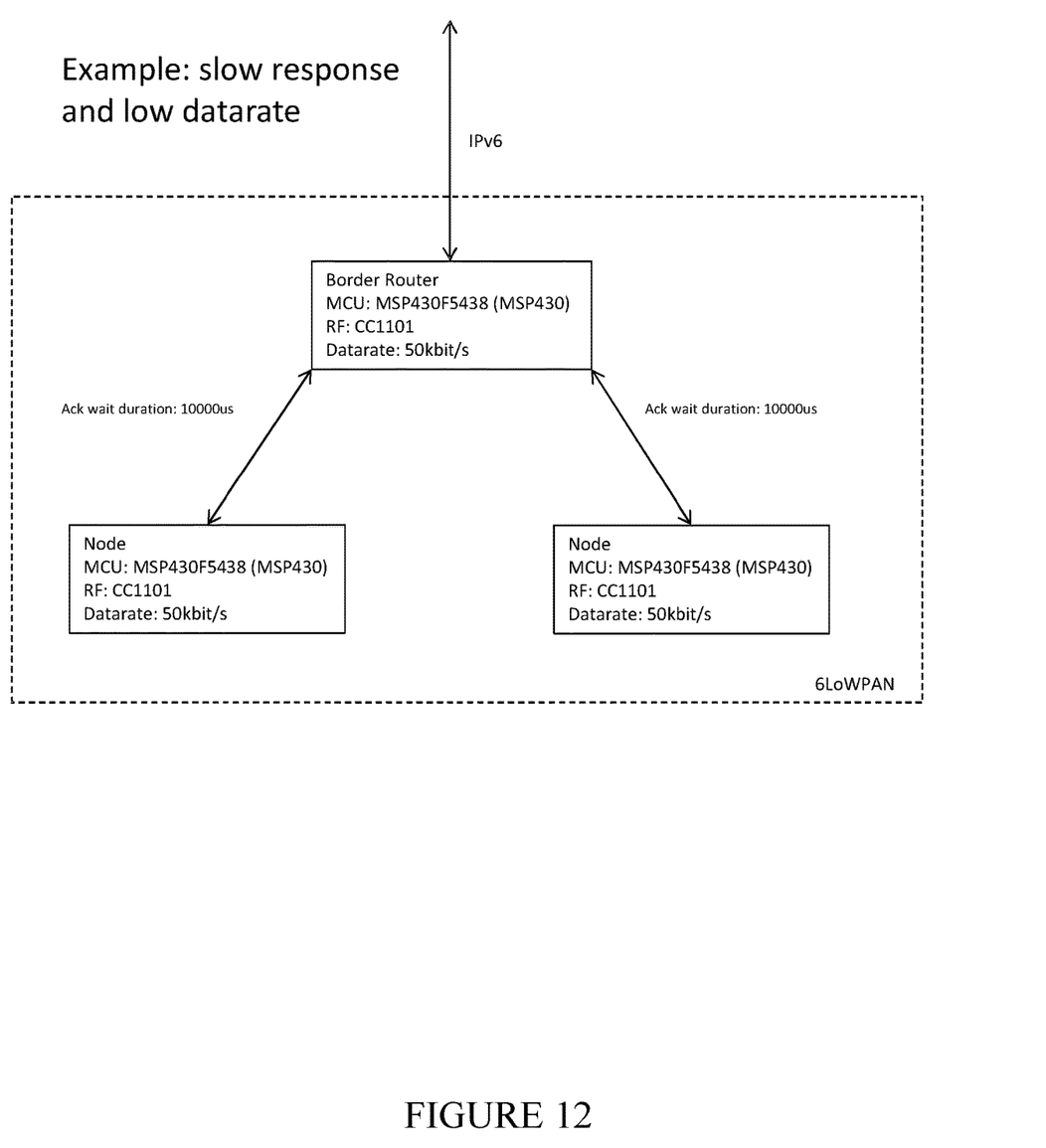

Long fixed Ack wait time for devices in FIG. 11, because slow devices (MSP430+CC1101) exist.

Very long fixed Ack wait time for devices in FIG. 12, because slow devices with low data rate exist.

A particular problem that may arise in networks is thus that of the acknowledgement wait duration that is to be set when a unicast packet is sent over the network. Conventionally, when a packet is sent, the sender waits for an acknowledgement from the receiver. If the acknowledgement is not received by the time the acknowledgement wait duration expires, the packet is re-transmitted on the assumption that it has been dropped in transit. Acknowledgement wait durations are typically set by the sender to a fixed setting that is often calculated using a formula from a communications protocol standard, and by entering parameters based on a system administrator's knowledge of the system characteristics. That knowledge may be incomplete and subject to rough-and-ready rules of thumb, especially when there are very many devices and communications paths in the network—an administrator may not have sufficient accurate knowledge to be equipped to set a duration that is efficient, and may be reduced to setting a duration for all transmissions that will accommodate the very slowest devices and communications paths. It will be clear to one of skill in the art that this may, in the worst cases, lead to either of the extremes: unnecessarily frequent retransmissions or unnecessarily long wait durations.

In a first aspect of the disclosed technology, there is provided a machine-implemented method for controlling retry of unicast data packet transmission from a transmitter node to a receiver node, the method comprising selecting said receiver node from a set of receiver nodes having different processing delays; transmitting a first unicast data packet to said receiver node; establishing a delay, at said transmitter node, for an expected acknowledgement wait duration; receiving, at said transmitter node, an acknowledgement packet from said receiver node; responsive to an actual acknowledgement wait duration being less than said expected acknowledgement wait duration, setting said expected acknowledgement wait duration to a new expected acknowledgement wait duration comprising at least said actual acknowledgement wait duration; transmitting a second unicast data packet to said receiver node; establishing a delay, at said transmitter node, for said new expected acknowledgement wait duration; and responsive to expiry of said new expected acknowledgement wait duration without receipt of an acknowledgement packet from said receiver node, retrying the transmitting the second unicast data packet.

In a second aspect of the presently disclosed technology, there is provided a device having components adapted to perform the above method.

In a third aspect of the disclosed technology, there is provided a computer program product comprising computer-program code tangibly stored on a computer-readable medium, the computer program code executable by a computer system for performing the method according to the first aspect.

Figure 3:
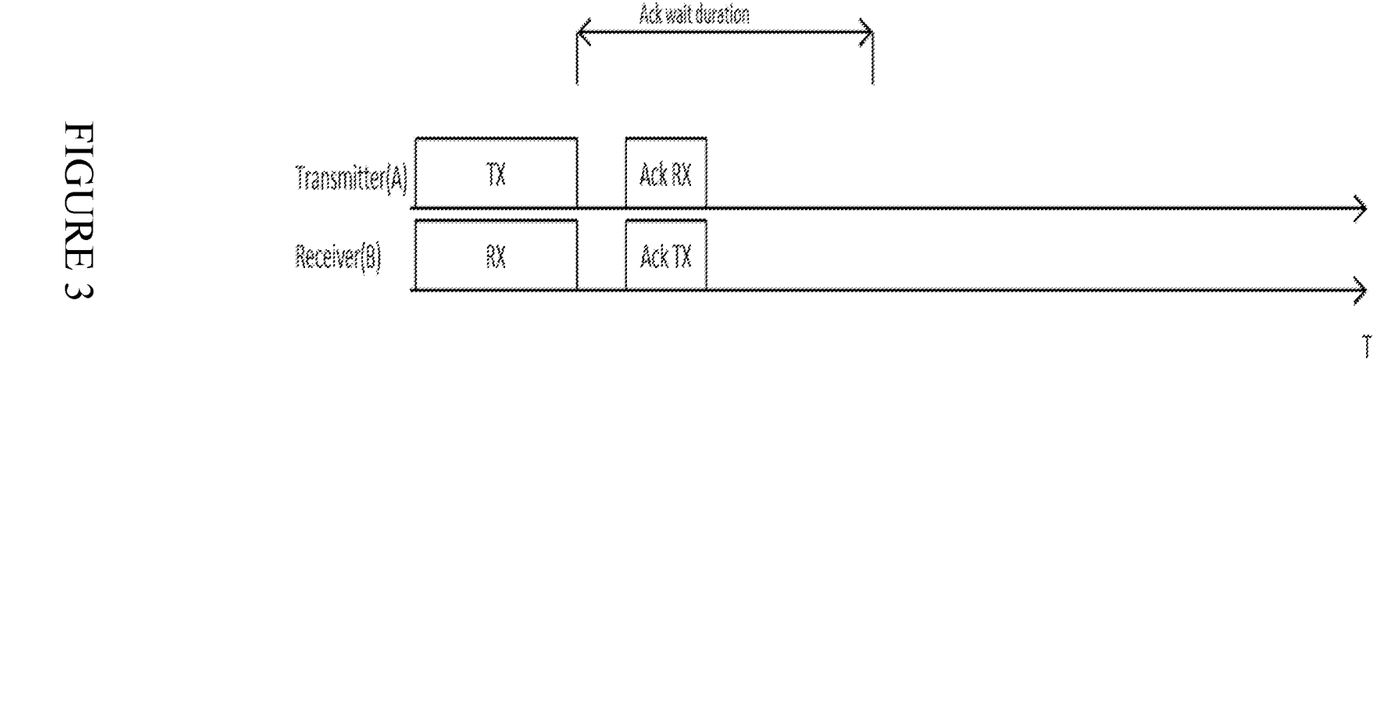
FIGS. 3 to 8 show time sequence diagrams in accordance with the known and the presently-disclosed technologies.

Turning now to FIG. 3, there is shown a time diagram describing transmission of a unicast data packet. Transmitting node (A) transmits a packet which is received by the receiving node (B). Transmitting node (A) starts a timeout (Ack wait duration) and within that time receiving node (B) should send an acknowledgement frame to verify that it has received the data.

Figure 4:
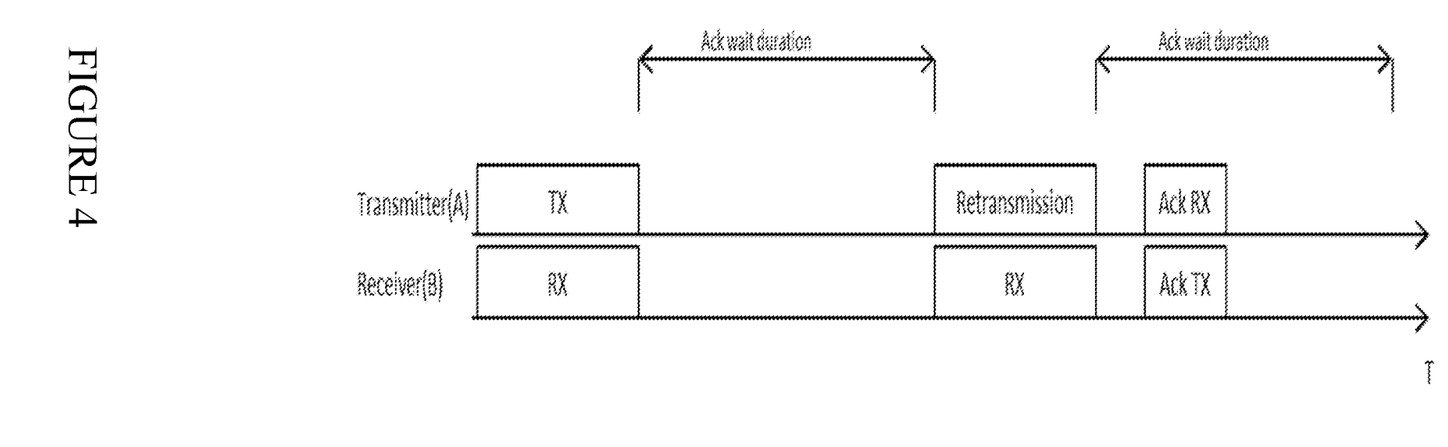

If acknowledgement is not received by node (A), it will start retransmission after Ack wait duration as in FIG. 4. The time referred to here as "Ack wait duration" is generally defined in MAC specifications e.g. in IEEE 802.15.4-2006 according to the formula:

$$macAckWanDuration = aUnitBackoffPeriod + aTurn\text{-}aroundTime + phySHRDuration + [6*phySymbolsPerOctet]$$

This means that the time of Ack wait duration is dependent upon the processor platform and communication component configuration. One hard coded static timeout period would only work for all platforms and configurations if it was very long, and that would cause considerable latency in retransmissions.

The disclosed technology determines a unique Ack wait duration for each receiver to support both slow and fast platforms in terms of processing power in a same network, and acts to reduce the latency of retransmissions by using the determined Ack wait duration.

Figure 5:
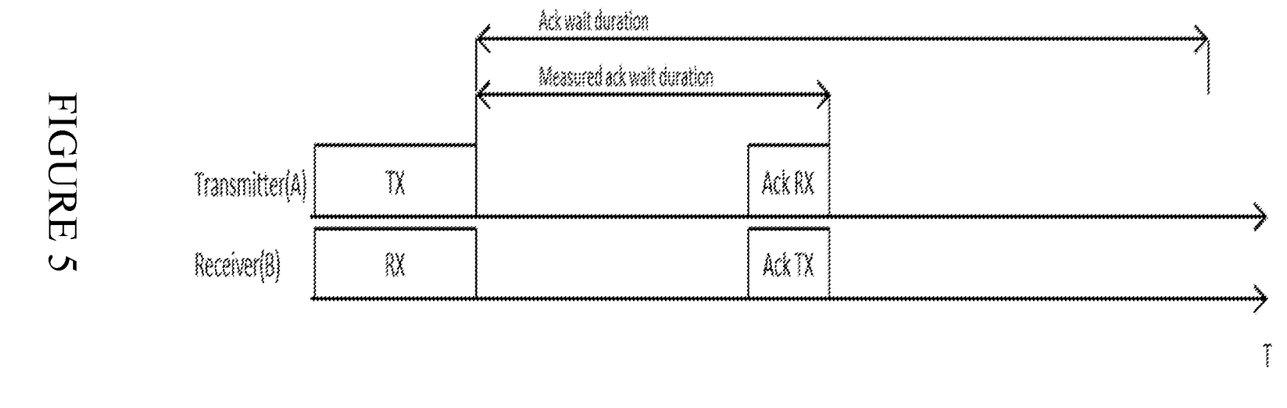

FIG. 5 presents a situation where transmitting node (A) is sending a first unicast packet to the receiving node (B). Because (A) has not yet sent any packets to (B) it is using a very long Ack wait duration set according to the formula. After transmission, (A) starts a timer to measure how long it takes to receive an acknowledgement from (B). When Ack is received, (A) adds the measured value into a "neighbour table" which is used to store information about known neighbour nodes.

Figure 6:
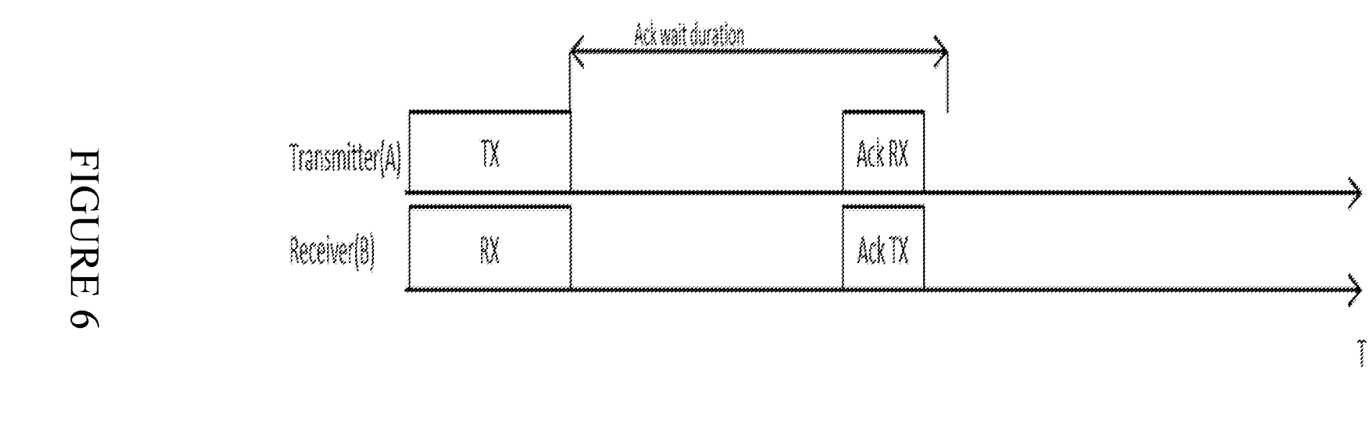

When node (A) transmits a second packet to node (B), it reads the measured Ack wait duration from the "neighbour table", adds some safety margin, and uses this value as receiver (B) specific Ack wait duration as in FIG. 6.

Figure 7:
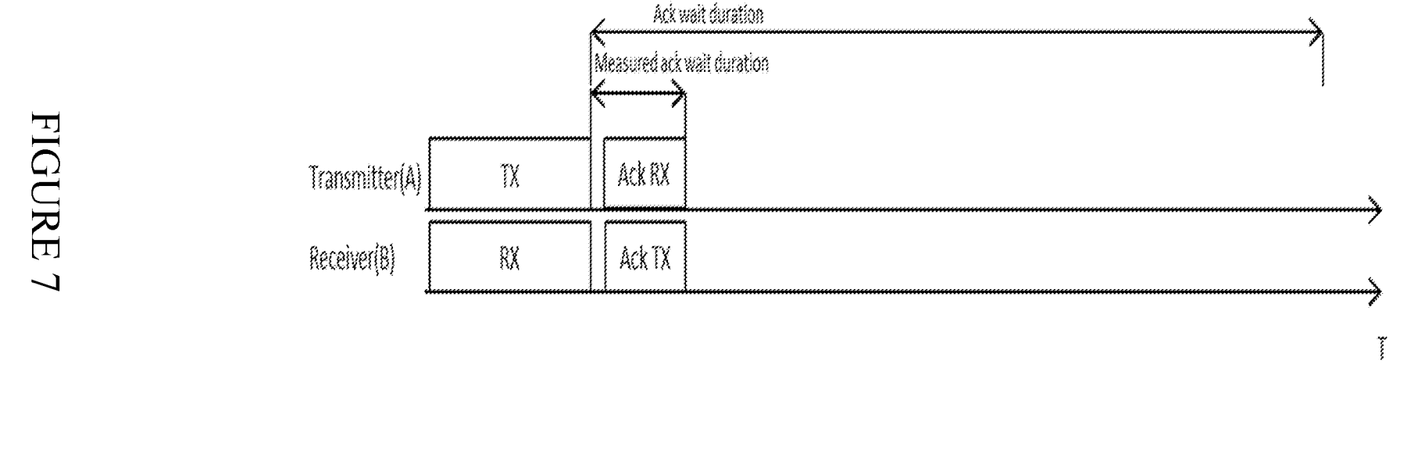

In this way node (A) can, in time, determine the Ack wait duration for all devices with which it is communicating. An advantage of this mechanism is that node (A) can use very aggressive retransmission timing when it knows how fast the receiving node should acknowledge the transmitted packet. In FIG. 7, transmitting node (A) measures a very short Ack wait duration for node (B), for the first unicast packet.

Figure 8:
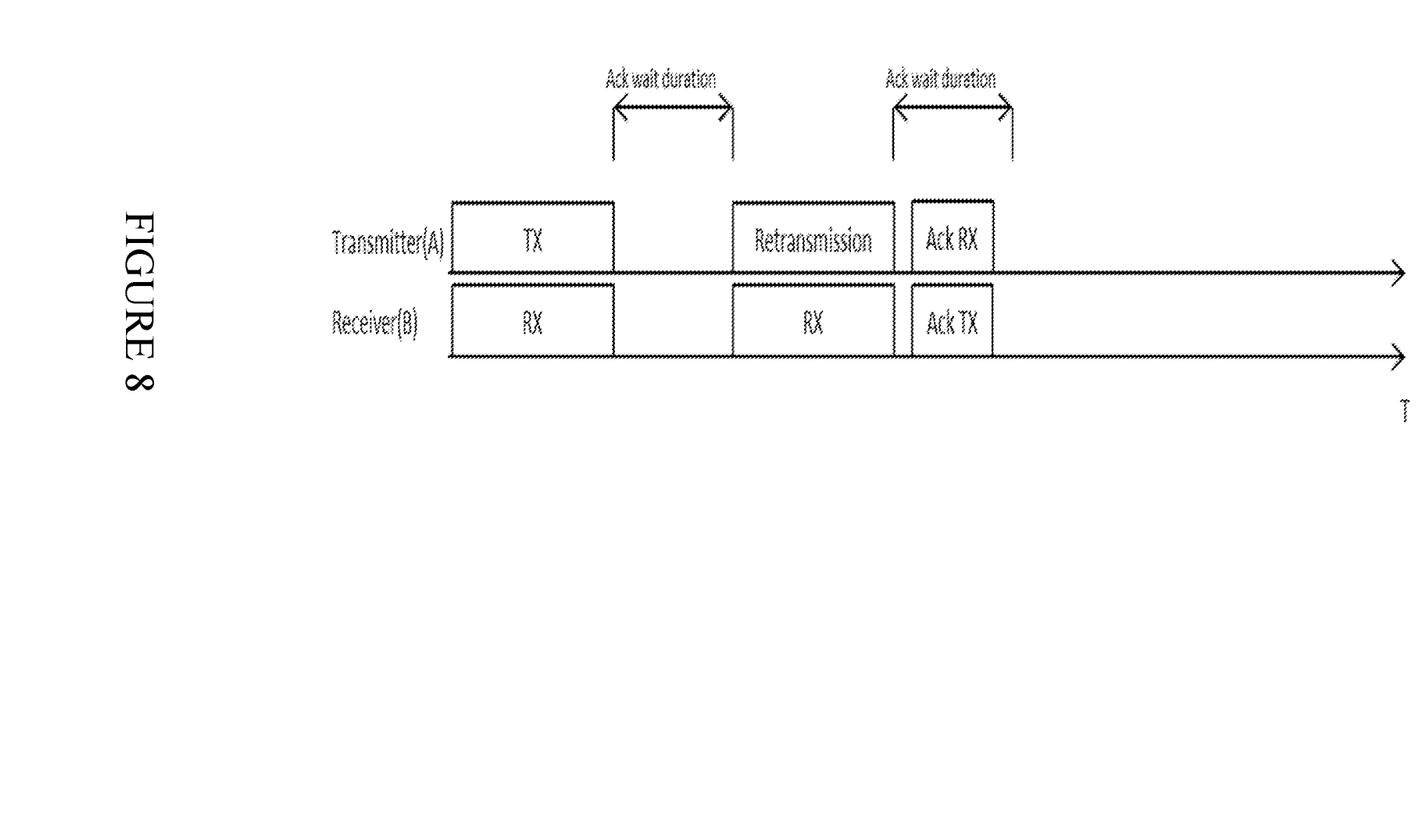

When the system of the disclosed technology has accurate data for the Ack wait duration, it can take advantage of very short retransmission timings as shown in FIG. 8.

In an embodiment, it is possible to repeat the described measurement periodically to be able to react to changing circumstances like temperature changes. In this way the "neighbour table" is more likely to contain valid Ack wait durations for all neighbour nodes.

Figure 1:
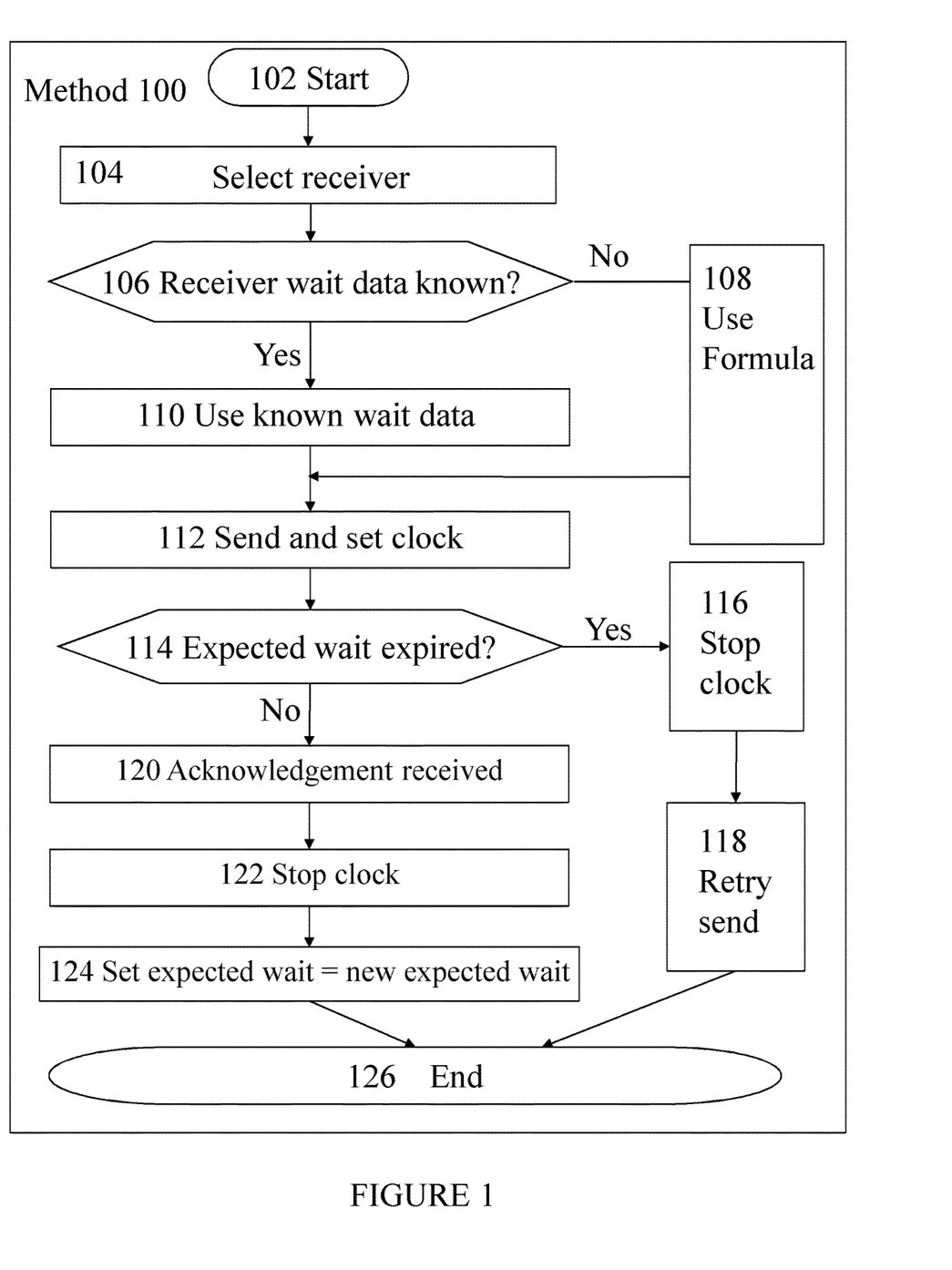
FIG. 1 shows a method in accordance with the wait duration setting technology.

Turning now to FIG. 1, there is shown a machine-implemented method 100 according to the presently-disclosed technology. The method begins at Start step 102, and at Select receiver step 104, a receiver is selected from a set of receiver nodes, typically having different processing delays because of their varied processor and communication component performance characteristics. At test step 106, a test is conducted to determine, in effect, whether the unicast transmission is the first for the elected receiver—that is, whether or not the system has already stored the receiver's individual wait data. If the outcome of test step 106 is negative, the system has no knowledge of the receiver's wait data and at step 108 the system uses a predetermined wait duration derived, typically, from a formula relating at least the known system and network characteristics and proceeds to Send and set clocks step 112. If the outcome of test step 106 is positive, the system has the receiver's wait data stored, for example, in a "neighbour table" as described above, at step 110, uses the known wait data to determine the Ack wait duration for the transmission to the receiver. At step 112, the unicast data packet is sent and the Ack wait duration clock is set to the expected wait time. If, at test step 114, the expected wait time expires without receipt of an acknowledgement packet, the clock is stopped at step 116 and the send is retried at step 118. If the expected wait time has not expired at 114 and an acknowledgement packet is received at step 120, the clock is stopped at step 122 and the expected wait for the receiver is set to a new expected wait at step 124. The system may store the new expected wait duration for the receiver in a "neighbour table" as described above.

The machine-implemented method may further comprise setting a retry count threshold and, responsive to a crossing of the retry count threshold, resetting the new expected acknowledgement wait duration to the previous expected acknowledgement wait duration, typically the duration derived from the formula. In one possible variant, a validity lifetime for the new expected acknowledgement wait duration may be set, and, responsive to the expiry of the validity lifetime, the new expected acknowledgement wait duration may be reset to the previous expected acknowledgement wait duration. In either variant, the setting the expected acknowledgement wait duration to the new expected acknowledgement wait duration may include adding a safety factor duration to the actual acknowledgement wait duration. Typically, the expected acknowledgement wait duration is determined by a protocol standard, and in one example, the protocol standard is a MAC communications standard.

Figure 2:
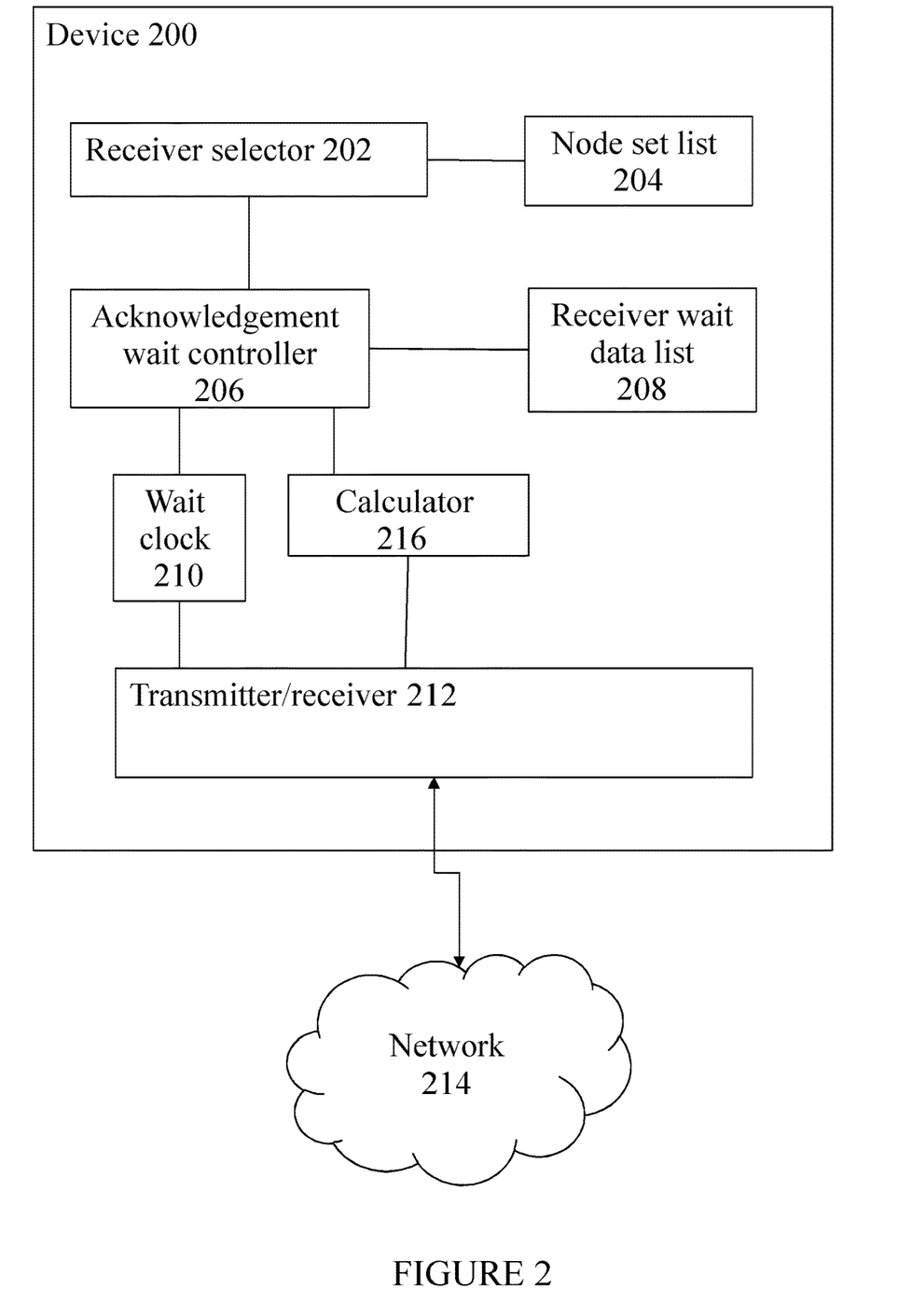
FIG. 2 shows a device in accordance with the wait duration setting technology.

In FIG. 2 is shown a Device 200 adapted to perform the method of controlling wait durations. Device 200 comprises a Receiver selector component 202 adapted to select a receiver from a set of receiver nodes which typically have different processing delays because of their varied processor and communication component performance characteristics. The Receiver selector component 202 selects the receiver using Node set list 204, and communicates with Acknowledgement wait controller 206. Acknowledgement wait controller 206 uses Receiver wait data list 208 to determine, in effect, whether it has already stored the receiver's individual wait data. If not, Acknowledgement wait controller 206 has no knowledge of the receiver's wait data and is thus configured to use a predetermined wait duration derived, typically, from a formula relating at least the known system and network characteristics. If Acknowledgement wait controller 206 has the receiver's wait data already stored, it uses the known wait data to determine the Ack wait duration for the transmission to the receiver, and communicates this to Wait clock 210. Transmitter/receiver 212 is configured to send unicast data packets over Network 214, to receive acknowledgements and to retry sends responsive to Wait clock 210. On receipt of an acknowledgement over Network 214, Transmitter/receiver 214 is operable to communicate the expected and actual wait durations to Calculator 216, which uses the actual wait duration to calculate a new expected wait duration and to supply that new expected wait duration to Acknowledgement wait controller 206, which in turn is operable to store the new expected wait duration in Receiver wait data list 208.

As will be appreciated by one skilled in the art, aspects of the present technology may be embodied as a system, method or computer program product. Accordingly, aspects of the present technology may take the form of an entirely hardware embodiment, and entirely software embodiment, or an embodiment combining software and hardware aspects.

Furthermore, aspects of the present technology may take the form of a computer program product embodied in a computer readable medium having computer readable program code embodied thereon. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

Computer program code for carrying out operations for aspects of the present technology may be written in any combination of one or more programming languages, including object oriented programming languages and conventional procedural programming languages. The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present technology may suitably be embodied in a logic apparatus comprising logic elements to perform the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present technology may be realized in the form of a computer implemented method of deploying a service comprising deploying computer program code operable to, when deployed into a computer infrastructure or network and executed thereon, cause said computer system or network to perform all of the method.

In a further alternative, the preferred embodiment of the present technology may be realized in the form of a data carrier having functional data thereon, said functional data comprising functional computer data structures to, when loaded into a computer system or network and operated upon thereby, enable said computer system to perform all of the method.

It will be clear to one skilled in the art that many improvements and modifications can be made to the foregoing exemplary embodiments without departing from the scope of the present disclosure.

The invention claimed is:

1. A machine-implemented method for controlling retry of unicast data packet transmission from a transmitter node to a receiver node, the method comprising:

selecting said receiver node from a set of receiver nodes having different processing delays;

transmitting a first unicast data packet to said receiver node;

determining, at said transmitter node, whether or not wait data of said receiver node is present in a neighbor table;

responsive to a determination that said wait data of said receiver node is present in said neighbor table, setting an expected acknowledgement wait duration based at least in part on said wait data;

responsive to a determination that said wait data of said receiver node is not present in said neighbor table, setting said expected acknowledgement wait duration based at least in part on system and network characteristics;

receiving, at said transmitter node, an acknowledgement packet from said receiver node after an actual acknowledgement wait duration;

responsive to the actual acknowledgement wait duration being less than said expected acknowledgement wait duration, setting said expected acknowledgement wait duration to a new expected acknowledgement wait duration comprising at least said actual acknowledgement wait duration;

storing said new expected acknowledgement wait duration in said neighbor table;

transmitting a second unicast data packet to said receiver node;

setting a retry count threshold;

responsive to no receipt of an acknowledgement of the second packet within said new expected acknowledgement wait duration, retrying transmitting the second unicast data packet without having received the acknowledgement; and responsive to a crossing of said retry count threshold, resetting said new expected acknowledgement wait duration to said expected acknowledgement wait duration.

2. The machine-implemented method as claimed in claim 1, further comprising setting a validity lifetime for said new expected acknowledgement wait duration.

3. The machine-implemented method as claimed in claim 2, further comprising, responsive to an expiry of said validity lifetime, resetting said new expected acknowledgement wait duration to said expected acknowledgement wait duration.

4. The machine-implemented method as claimed in claim 1, wherein said setting said expected acknowledgement wait duration to said new expected acknowledgement wait duration further comprises adding a safety factor duration to said actual acknowledgement wait duration.

5. The machine-implemented method as claimed in claim 1, wherein said expected acknowledgement wait duration is determined by a protocol standard.

6. The machine-implemented method as claimed in claim 5, wherein said protocol standard is a MAC communications standard.

7. A device operable in a communications network and having circuitry configured to perform a method for controlling retry of unicast data packet transmission from a transmitter node to a receiver node, the method comprising:
   selecting said receiver node from a set of receiver nodes having different processing delays;
   transmitting a first unicast data packet to said receiver node;
   determining, at said transmitter node, whether or not wait data of said receiver node is present in a neighbor table;
   responsive to a determination that said wait data of said receiver node is present in said neighbor table, setting an expected acknowledgement wait duration based at least in part on said wait data;
   responsive to a determination that said wait data of said receiver node is not present in said neighbor table, setting said expected acknowledgement wait duration based at least in part on system and network characteristics;
   receiving, at said transmitter node, an acknowledgement packet from said receiver node after an actual acknowledgement wait duration;
   responsive to the actual acknowledgement wait duration being less than said expected acknowledgement wait duration, setting said expected acknowledgement wait duration to a new expected acknowledgement wait duration comprising at least said actual acknowledgement wait duration;
   storing said new expected acknowledgement wait duration in said neighbor table;
   transmitting a second unicast data packet to said receiver node;
   setting a retry count threshold;
   responsive to no receipt of an acknowledgement of said second packet within said new expected acknowledgement wait duration, retrying transmitting the second unicast data packet without having received the acknowledgement; and
   responsive to a crossing of said retry count threshold, resetting said new expected acknowledgement wait duration to said expected acknowledgement wait duration.

8. A non-transitory computer readable medium containing a computer program product, said computer program product being executed in a processor of a computer system configured to perform a method for controlling retry of unicast data packet transmission from a transmitter node to a receiver node, comprising:
   selecting said receiver node from a set of receiver nodes having different processing delays;
   transmitting a first unicast data packet to said receiver node;
   determining, at said transmitter node, whether or not wait data of said receiver node is present in a neighbor table;
   responsive to a determination that said wait data of said receiver node is present in said neighbor table, setting an expected acknowledgement wait duration based at least in part on said wait data;
   responsive to a determination that said wait data of said receiver node is not present in said neighbor table, setting said expected acknowledgement wait duration based at least in part on system and network characteristics;
   receiving, at said transmitter node, an acknowledgement packet from said receiver node after an actual acknowledgement wait duration;
   responsive to the actual acknowledgement wait duration being less than said expected acknowledgement wait duration, setting said expected acknowledgement wait duration to a new expected acknowledgement wait duration comprising at least said actual acknowledgement wait duration;
   storing said new expected acknowledgement wait duration in said neighbor table;
   transmitting a second unicast data packet to said receiver node;
   setting a retry count threshold;
   responsive to no receipt of an acknowledgement of the second packet within said new expected acknowledgement wait duration, retrying transmitting the second unicast data packet without having received the acknowledgement; and
   responsive to a crossing of said retry count threshold, resetting said new expected acknowledgement wait duration to said expected acknowledgement wait duration.

9. The device of claim 7, wherein the device comprises a receiver selector component, wherein the receiver selector component selects said receiver node from the set of receiver nodes in a node set list.

10. The device of claim 7, wherein the device comprises an acknowledgement wait controller and a wait clock.

11. The device of claim 10, wherein the acknowledgement wait controller communicates the expected acknowledgement wait duration to the wait clock.

12. The device of claim 10, wherein the device comprises a transmitter/receiver that is operable to transmit the unicast data packets to said receiver node and to receive the acknowledgement packets from the receiver node.

13. The device of claim 12, wherein the transmitter/receiver is operable to retry transmitting unicast data packets responsive to the wait clock.

14. The device of claim 12, wherein the device further comprises a calculator, and wherein the transmitter/receiver is operable to communicate the expected acknowledgement wait duration and the actual acknowledgement wait duration to the calculator.

15. The device of claim 14, wherein the calculator uses the actual acknowledgement wait duration to calculate the new expected acknowledgement wait duration.

16. The device of claim 15, wherein the calculator supplies the new expected acknowledgement wait duration to the acknowledgement wait controller.

17. The device of claim 15, wherein the device comprises a receiver wait data list, and wherein the acknowledgement wait controller is operable to store the new expected acknowledgement wait duration in the receiver wait data list.

* * * * *